(12) United States Patent
Khan et al.

(10) Patent No.: US 7,775,257 B2
(45) Date of Patent: Aug. 17, 2010

(54) CASTING METHOD AND APPARATUS

(75) Inventors: Irshad Khan, Cape Town (ZA); Wessel Marthinus Cronje, Cape Town (ZA)

(73) Assignee: University of Cape Town, Cape Town (ZA)

( * ) Notice: Subject to any disclaimer, the term of this patent is extended or adjusted under 35 U.S.C. 154(b) by 282 days.

(21) Appl. No.: 11/661,735

(22) PCT Filed: May 17, 2005

(86) PCT No.: PCT/IB2005/001329

§ 371 (c)(1),
(2), (4) Date: Mar. 1, 2007

(87) PCT Pub. No.: WO2006/024899

PCT Pub. Date: Mar. 9, 2006

(65) Prior Publication Data

US 2008/0314547 A1    Dec. 25, 2008

(30) Foreign Application Priority Data

Sep. 2, 2004  (ZA) ................................ 2004/6995

(51) Int. Cl.
*B22D 35/00* (2006.01)
*B22D 37/00* (2006.01)

(52) U.S. Cl. ...................................... 164/136; 164/335

(58) Field of Classification Search ................. 164/136, 164/335
See application file for complete search history.

(56) References Cited

U.S. PATENT DOCUMENTS 5,381,855 A * 1/1995 Mezger ...................... 164/457
5,882,582 A   3/1999 Comarteau et al.

FOREIGN PATENT DOCUMENTS

JP       10 193080 A    7/1998
WO    WO 97/06060 A    2/1997

* cited by examiner

*Primary Examiner*—Kuang Lin
(74) *Attorney, Agent, or Firm*—Marshall & Melhorn, LLC

(57) ABSTRACT

The invention concerns a casting apparatus which includes a crucible support and induction heating means (14, 16, 18) arranged to receive and support a crucible (10) containing material which is to be melted and poured from an outlet (38). The outlet is positioned on a vertical axis (40). The support and induction heating means also operates to apply induction heating to the material to melt it in the crucible. There is also a translation mechanism which tilts the crucible while the crucible is still supported and while heat is continuously applied to it. This mechanism operates in such a way that during tilting, the outlet of the crucible is maintained on the vertical axis so that the molten material pours from the outlet on the vertical axis. In the embodiments described, the crucible is simultaneously moved vertically towards the mould into which the melt pours.

16 Claims, 4 Drawing Sheets

CASTING METHOD AND APPARATUS

BACKGROUND TO THE INVENTION

THIS invention relates to a casting method and apparatus and in particular to a casting method and apparatus employing an induction furnace.

An induction furnace is one in which electrically conductive material is caused to melt by induction of electrical current in it through application of a magnetic field. The material is heated as a result of power dissipation in it, attrributable to the electrical resistivity of the material as current flows through it, i.e. so-called Ohmic heating. A conventional induction furnace consists of an electrical generator or inverter which generates an alternating current or alternating voltage.

The present invention is applicable both to current-fed inverter systems, in which alternating current of fixed amplitude is generated and voltage-fed inverter systems, in which alternating voltage of fixed amplitude is generated. In either case, the current or voltage is passed through a conductive coil in the form of a solenoid in order to generate a magnetic field around the coil. The lines of magnetic flux form a toroidal shape in which the central axis of the toroid is coincident with the central axis of the coil. It is conventional practice to locate the material which is to be melted on this axis at the centre of the coil, where the magnetic flux is most dense. It is also conventional practice to accommodate the material at this position in a crucible. As melting proceeds, the crucible will contain both solid and liquid phases of the material. Even after complete melting, it may be necessary, to achieve a high quality casting, to maintain the inductive heating in order to hold the material in a super-heated state. Once the appropriate temperature has been achieved the material must be transferred to a mould or flask. This is normally achieved either by tilting the crucible in order to pour its contents through a spout or other outlet into the mould, or by accelerating the crucible in order to eject its contents under inertial effects.

In either system, the crucible is moved. This movement is problematical in that it requires, in conventional practice, disconnection of the solenoid or removal of the crucible from the solenoid. In the absence of induction heating rapid cooling of the material can take place when the crucible is moved. Such cooling may detract from the quality of the eventual casting.

It is an objective of the present invention to address this problem.

SUMMARY OF THE INVENTION

According to one aspect of the invention there is provided a casting apparatus comprising crucible support and induction heating means arranged to receive and support a crucible containing material which is to be melted and poured from an outlet of the crucible, with the outlet positioned on a vertical axis, the support and induction heating means furthermore being operable to apply induction heating to the material to melt it in the crucible; and translation means operable, while the support and induction heating means continues to support the crucible and apply induction heating to material therein, to tilt the crucible to cause molten material to pour from the outlet of the crucible, the translation means constraining the crucible such that the outlet remains positioned on the vertical axis during tilting, whereby molten material pours from the outlet of the crucible at least substantially on the vertical axis.

The preferred apparatus further comprises a mould support apparatus for supporting a mould having an inlet on the vertical axis into which molten material is to be poured from the crucible as the crucible tilts, and the translation means is operable to cause relative vertical movement to take place between the crucible and the mould support apparatus while simultaneously operating to tilt the crucible, such that molten material pours from the crucible into the inlet of a mould supported by the mould support apparatus.

The mould support apparatus may be vertically stationary, the translation means being operable to move the crucible vertically downwardly from an initial position towards the mould support apparatus.

Advantageously, the translation means comprises a rotatable and vertically movable support member and means for constraining the support member to move vertically while simultaneously rotating about a horizontal axis intersecting the vertical axis, and the crucible support and induction heating means is connected to the support member such that the outlet of a crucible supported thereby lies on the vertical axis and follows that axis when the member moves vertically and rotates thereby to tilt the crucible and move it vertically.

Thus this aspect of the invention address the aforementioned problem of undesired cooling of the molten material by maintaining induction heating of the material as the crucible is tilted to pour out its contents. The invention furthermore addresses the problem of accommodating different mould sizes by controlling the movement of the crucible, during tilting, in such a way that the outlet, typically a spout, moves vertically along a predetermined vertical axis towards the mould. In practice, the inlet of the mould will also be positioned on this axis so that, irrespective of the size of the mould, molten material which pours out of the crucible falls substantially along the vertical axis and into the mould.

According to another aspect of the invention there is provided a casting method comprising the steps of placing material which is to be melted in a crucible having an outlet positioned on a vertical axis, applying induction heating to the material in the crucible to cause the material to melt, providing a mould having a mould inlet on the vertical axis, and tilting the crucible, while maintaining the application of induction heating to the material and while keeping the outlet of the crucible on the vertical axis, in order to pour molten material out of the crucible from the outlet, substantially along the vertical axis into the mould.

Other features of the method and apparatus of the invention are set forth in the appended claims.

BRIEF DESCRIPTION OF THE DRAWINGS

The invention will now be described in more detail, by way of example only, with reference to the accompanying drawings in which.

DESCRIPTION OF THE ILLUSTRATED EMBODIMENTS

Figure 1:
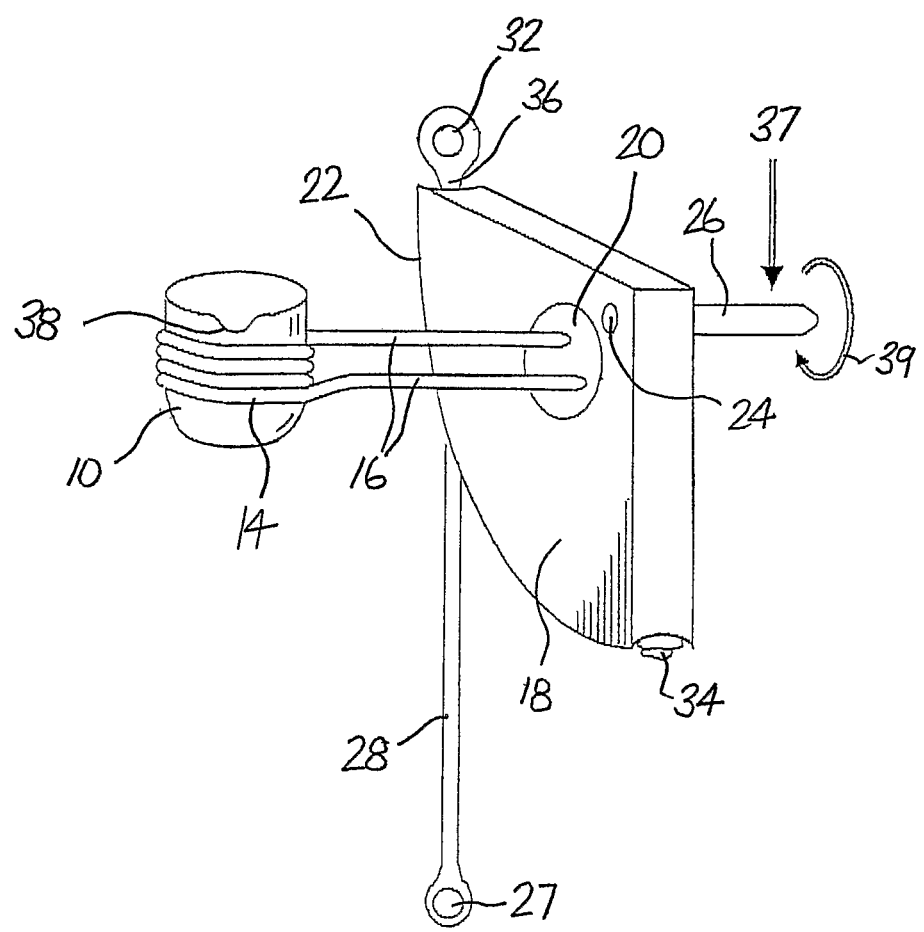
FIG. 1 diagrammatically illustrates certain components of a casting apparatus according to the invention.

The components illustrated in FIGS. 1 to 4 form part of a induction furnace. In FIG. 1, the numeral 10 indicates a crucible in which material, typically a metal, is to be melted and from which the melted material is to be poured into a mould or flask 12 seen in FIG. 6. The crucible is received in an induction coil 14 having coil leads 16. As illustrated, the coil 14 and leads 16 provide full support for the crucible. In some situations, further mechanical support components may also be required to carry the weight of the crucible and its contents. For convenience of illustration, such further components are not illustrated.

The coil leads 16, and further mechanical support components where these are provided, are connected to a rotatable and vertically movable support member 18 at a chuck 20. The member 18 is shaped substantially as a sector of a circle with a circular periphery 22 and a central axis of rotation 24 spaced from the chuck 20. A horizontally extending control arm 26 is connected to the member 18 at the axis 24.

One end 27 of a cable 28 is connected to a fixed part of the frame of the induction furnace. The opposite end 30 of the cable 28 is attached to the periphery 22 of the member 18 towards one end thereof. In similar fashion opposite ends 32 and 34 of another cable 36 are connected to the fixed frame structure and to the periphery 22 of the member 18 towards the other end thereof. It will be noted that the cables locate in grooves at the periphery of the member.

The outlet of the crucible, in the form of a spout 38, lies on the axis 24.

In use, the contents of the crucible are melted by induction heating through the magnetic field generated by the coil 14. When the molten contents are to be poured into the mould 12, the control arm 26 is moved vertically downwardly as indicated by the arrow 37. In practice, a suitable drive mechanism may be provided to move the control arm downwardly.

Downward movement of the control arm 26 also moves the member 18 vertically downwardly and, with it, the coil 14, mechanical support components if present and the crucible 10. Simultaneously, the action of the constraining means established by the cables 28 and 36 causes the member 18 to rotate about the axis 24 as indicated by the arrow 39. Thus the member 18 performs a rolling action with its periphery in effect rolling on the vertical plane containing the vertical parts of the cables. The effect of this is that the crucible is tilted in such a manner that its molten contents pour from the spout 38.

Figure 2A:
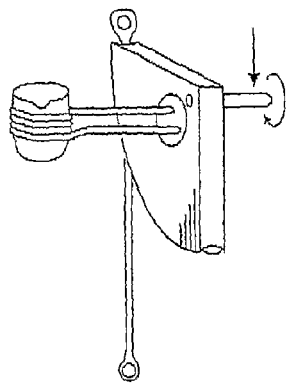
FIGS. 2(a), 3(a) and 4(a) diagrammatically and in sequential perspective views, illustrate the operation of the components seen in FIG. 1 in respective perspective views in a casting procedure.
Figure 2B:
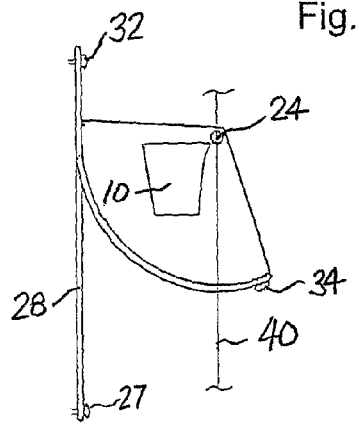
FIGS. 2(b), 3(b) and 4(b) diagrammatically illustrate the same sequence as FIGS. 2(a), 3(a) and 4(a) in respective elevation views.
Figure 3A:
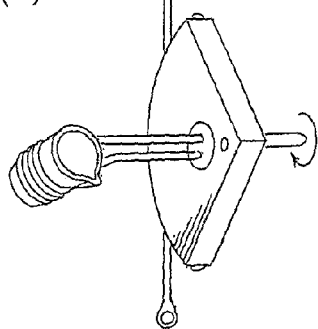
Figure 3B:
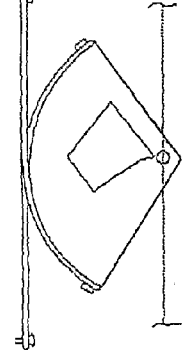
Figure 4A:
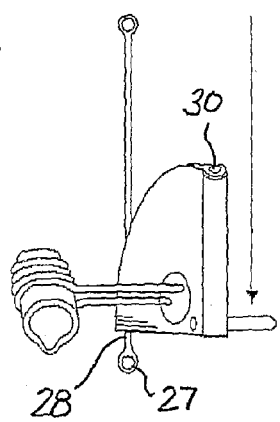
Figure 4B:
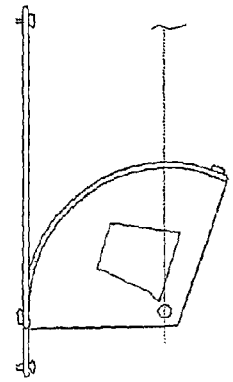

This sequence is illustrated in FIGS. 2(*a*) to 4(*a*) and 2(*b*) to 4(*b*), which also show that as tilting of the crucible takes place, the spout 38 moves along the same vertical axis 40 as the axis 24, which intersects that axis. The fact that the spout 38 moves along a constant vertical path, i.e. along the axis 24, means that its contents can be expected to pour out substantially on that same path. In this regard it will be understood that the vertical path on which the material pours may vary slightly from the vertical axis, particle if the crucible is tilted rapidly. Nevertheless it is expected that in normal operation, with normal tilting speeds, the poured material will at least substantially follow the vertical path established by the axis 24.

Figure 5:
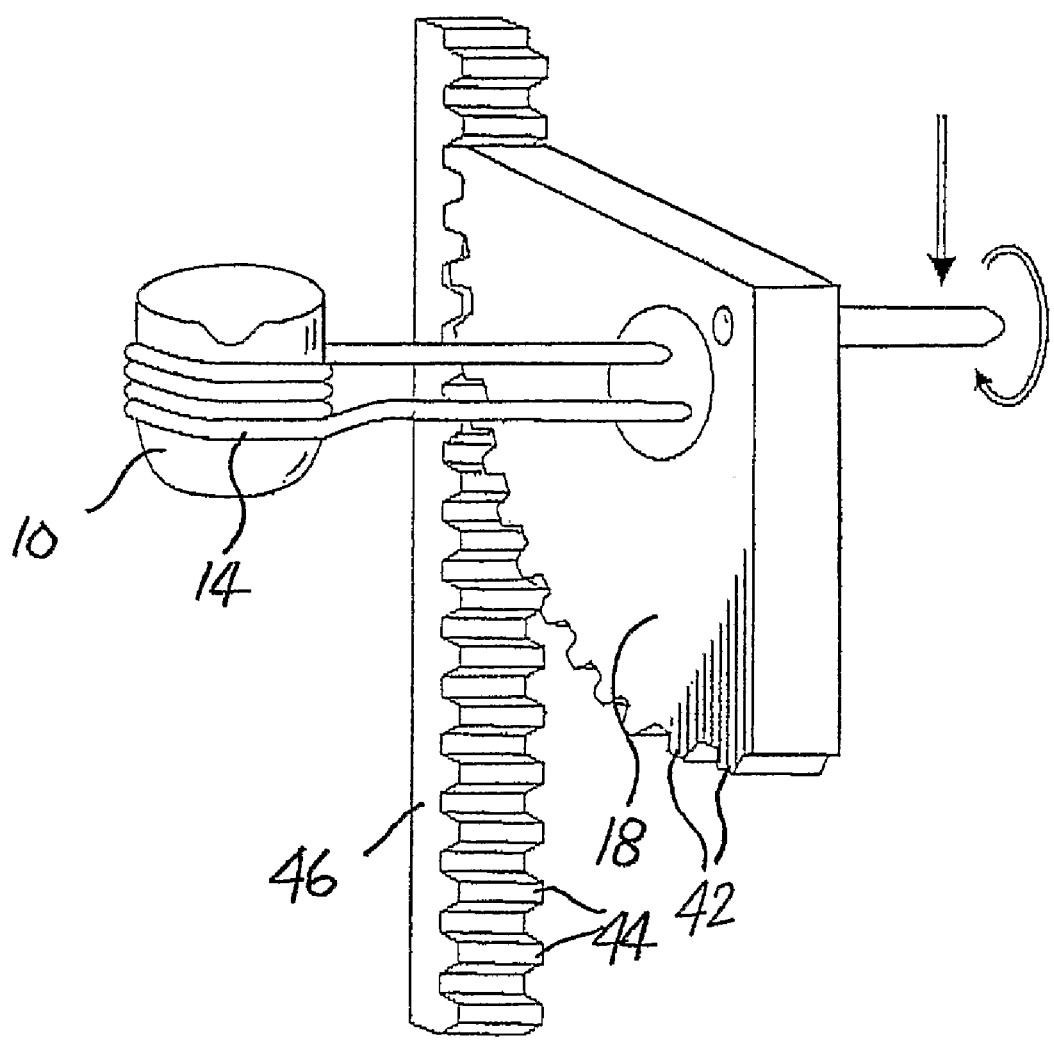
FIG. 5 diagrammatically illustrates certain components of a casting apparatus according to another embodiment of the invention.

Constraining means other than the cable mechanism illustrated in FIGS. 2(*a*) to 4(*a*) and 2(*b*) to 4(*b*) are within the scope of the invention. Another example is illustrated in FIG. 5 which shows how the member 18 can be constrained to undergo a vertical rolling movement by a rack and pinion type of mechanism. The part-circular periphery of the member 18 is formed with teeth 42 which mesh with teeth 44 on a vertical, fixed rack 46. It will be understood that in this case as well the spout of the crucible is constrained, during tilting, to move along a vertical axis as the member 18 moves vertically downwardly.

Throughout the rotational and vertical translation undergone by the crucible induction heating is maintained. In this way, a required high temperature can be maintained in the melt as long as possible in order to ensure that a high quality casting results.

Figures 6, 7:
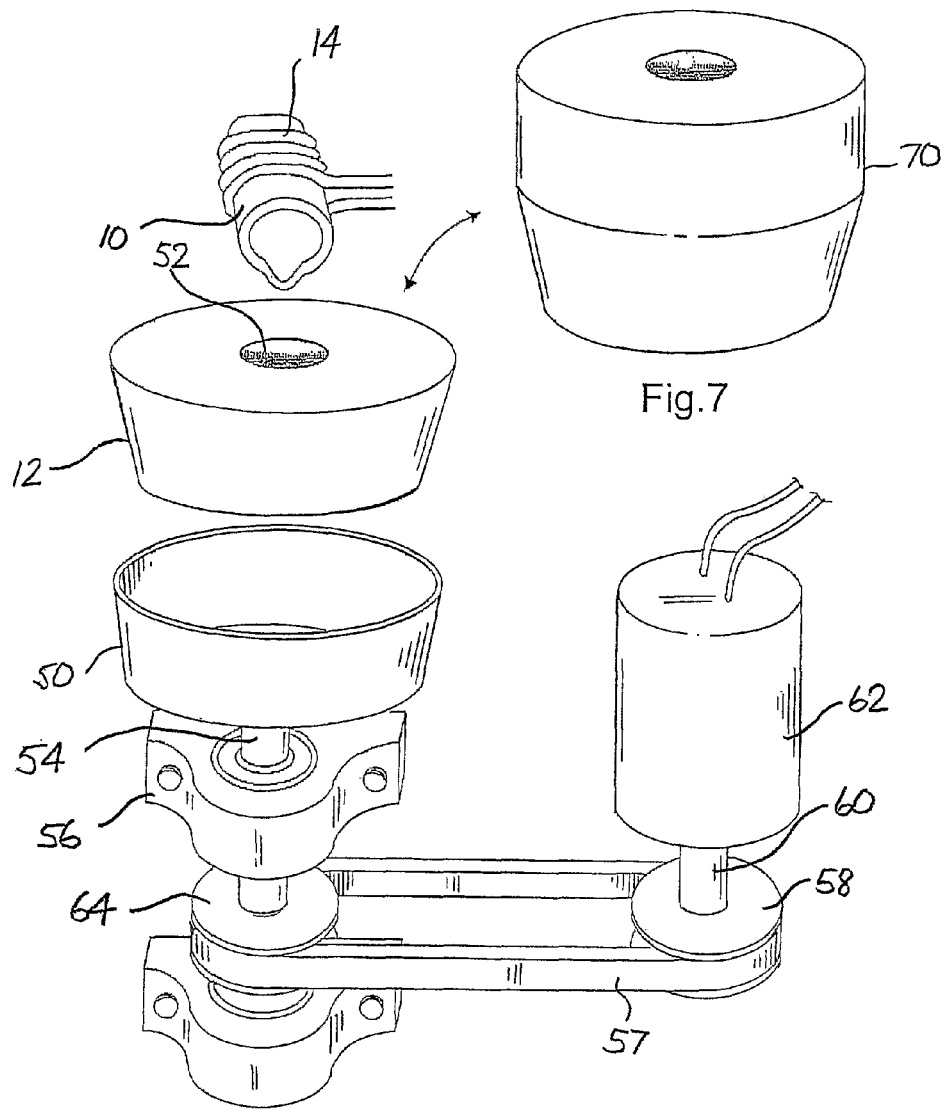
FIG. 6 diagrammatically illustrates further components of the casting apparatus of the invention.
FIG. 7 illustrates an alternative embodiment of the mold 12 of the present invention.

Reference is now made to FIG. 6 which illustrates further components of the casting apparatus. The mould or flask 12 has a tapered, frusto-conical external shape and is received complementally in a tapered cradle 50. The mould 12 has a central, funnel-shaped inlet 52 which lies on the vertical axis 40 and so is vertically aligned with the spout 38 in order to receive molten material which pours from the crucible and falls vertically.

In this embodiment, the mould has internal mould cavities (not visible) located radially outwardly of the inlet and communicating with the inlet through radial channels or passages (also not visible). The cradle is mounted fast on a vertical shaft 54 supported in a bearing block 56. A Vee-belt or toothed belt 57 acts between a pulley 58 on a shaft 60 driven by an electric motor 62 and another pulley 64 on the shaft 54.

In operation, the cradle 50 and mould 12 rotate about the vertical axis. Accordingly molten material which pours out of the crucible into the inlet 52 is accelerated outwardly into the mould cavities through the internal passages. In this way, the molten material is forced into the mould cavities in order to enhance the quality of the casting which is achieved.

The numeral 70 in FIG. 6 indicates an alternative mould or flask which can be used in place of the mould 12 and which is still able to nest complementally in the cradle 50. Thus an advantage of the described arrangement is its ability to accommodate moulds of different capacity. A further advantage is the centralization, and proper alignment of the mould, which is achieved by the complemental tapers on the mould and the cradle.

The facility for rotational adjustment of the connection between the solenoid coil and the member 18, i.e. by rotational adjustment of the chuck 20 as mentioned above, is also advantageous in a number of respects. It allows the initial orientation of the crucible, i.e. at the starting position of the crucible, to be set relative to the member 18. By appropriate adjustment at this connection point it is possible to set up the crucible for different melt volumes, i.e. it is possible to set the angle of tilt of the crucible so that pouring starts immediately or soon after downward movement and rotation of the member 18 commences. This in turn provides the ability to use moulds of different vertical extent, for instance the moulds 12 and 70. Still further, it provides the facility for crucibles of different capacity by allowing the initial angle of tilt always to be set so that the spout or other outlet of the crucible is correctly positioned describe a vertical locus when the member 18 is moved vertically and rotates.

As indicated above, the melt may not pour from the spout exactly along the axis 40 in practice, particularly if the crucible is tilted rapidly with the result that the melt rushes out with some horizontal momentum. In each particular instance, the apparatus will however be set up with a view to ensuring that the mould inlet is placed in the path of the poured material and this will in general be very close to if not exactly on the vertical axis 40. References made in this specification to the melt pouring along the vertical axis and the mould inlet being on the vertical axis should be construed accordingly.

The invention claimed is:

1. A casting apparatus comprising
   crucible support and induction heating means arranged to receive and support a crucible containing material which is to be melted and poured from an outlet of the crucible, with the outlet positioned on a vertical axis and on a horizontal axis which at all times intersects the vertical axis, the support and induction heating means furthermore being operable to apply induction heating to the material to melt it in the crucible; and
   translation means operable, while the support and induction heating means continuously supports the crucible and applies induction heating to material therein, to tilt the crucible about the horizontal axis while simultaneously moving the crucible and accordingly the horizontal axis and outlet positioned thereon, vertically downward with the horizontal axis remaining in intersection with the vertical axis, thereby causing molten material to pour from the outlet of the crucible substantially on the vertical axis, wherein the translation means comprises a rotatable and vertically movable support member which has circular periphery and means for constraining the support member to move vertically downward while simultaneously rotating the support member about the horizontal axis.

2. The apparatus according to claim 1 further comprising a mold support apparatus for supporting a mold having an inlet substantially on the vertical axis into which molten material is to be poured from the crucible as the crucible tilts, such that molten material pours from the crucible into the inlet of a mold supported by the mold support apparatus.

3. The apparatus according to claim 1 wherein the crucible support and induction heating means is connected to the support member such that the horizontal axis intersects the vertical axis and remains in intersection with that axis when the member moves vertically and rotates thereby to tilt the crucible and move it vertically.

4. The apparatus according to claim 3 wherein the crucible support and induction heating means comprises a solenoid coil in which the crucible is receivable, the coil being connected to the support member at a position spaced from the horizontal axis.

5. The apparatus according to claim 4 wherein the solenoid coil is connected to the member in a manner permitting adjustment, about a horizontal axis, of the orientation of the crucible relative to the support member.

6. The apparatus according to claim 3 wherein the constraining means operates to cause rolling movement of the support member on this periphery when the member moves vertically.

7. The apparatus according to claim 6 wherein the member is shaped as a sector of a circle.

8. The apparatus according to claim 7 wherein the constraining means comprises cables each attached at one end to a fixed structure, the cables having opposite ends attached to the periphery of the sector at angularly spaced apart positions.

9. The apparatus according to claim 7 wherein the constraining means comprises interengaging teeth on the member, which acts as a pinion, and on a fixed, vertical element acting as a rack for the pinion.

10. The apparatus according to claim 2 wherein the mold support apparatus comprises means for rotating the mold.

11. The apparatus according to claim 10 wherein the mold support apparatus includes a cradle for supporting the mold and means for rotating the cradle.

12. The apparatus according to claim 11 and comprising a mold which includes mold cavities positioned radially outwardly of an inlet to the mold.

13. The apparatus according to claim 11 wherein the cradle is conically tapered to receive and centralize a conically tapered mold.

14. A casting method using the apparatus of claim 1 comprising the steps of placing material which is to be melted in a crucible having an outlet positioned on a vertical axis and on a horizontal axis which at all times intersects the vertical axis, applying induction heating to the material in the crucible to cause the material to melt, providing a mold beneath the crucible, the mold having a mold inlet substantially on the vertical axis, and simultaneously tilting the crucible about the horizontal axis while moving the crucible and accordingly the horizontal axis and the outlet positioned thereon vertically downward towards the mold, while continuously maintaining the application of induction heating to the material and while keeping the horizontal axis in intersection with the vertical axis, in order to pour molten material out of the crucible from the outlet, substantially along the vertical axis into the mold inlet.

15. The method according to claim 14 including the step of rotating the mold about the vertical axis as molten material is poured into the inlet.

16. The method according to claim 15 wherein rotation is applied to a cradle in which the mold is positioned thereby to rotate the mold about the vertical axis.

* * * * *